United States Patent

Demiryont

[11] Patent Number: 5,138,481
[45] Date of Patent: Aug. 11, 1992

[54] ELECTROCHROMIC DEVICE WITH COLOR GRADIENT AND METHOD OF MAKING THE DEVICE

[75] Inventor: Hulya Demiryont, Farmington Hills, Mich.

[73] Assignee: Ford Motor Company, Dearborn, Mich.

[21] Appl. No.: 734,385

[22] Filed: Jul. 23, 1991

[51] Int. Cl.$^5$ ............................................. G02F 1/01
[52] U.S. Cl. .............................. 359/269; 359/270; 359/272; 359/275
[58] Field of Search ................ 359/269, 270, 272, 275

[56] References Cited

U.S. PATENT DOCUMENTS

| | | | |
|---|---|---|---|
| 3,578,843 | 5/1971 | Castellion | 359/267 |
| 3,840,288 | 10/1974 | Schnatterly | 359/274 |
| 3,971,624 | 7/1976 | Bruesch et al. | 359/267 |
| 4,231,641 | 11/1980 | Randin | 359/269 |
| 4,252,418 | 2/1981 | Barclay et al. | 359/267 |
| 4,354,741 | 10/1982 | Mano et al. | 359/270 |
| 4,367,267 | 1/1983 | Oi | 359/270 |
| 4,390,246 | 6/1983 | Miyoshi | 359/270 |
| 4,529,275 | 7/1985 | Ballmer | 359/265 |
| 4,561,729 | 12/1985 | Heinz et al. | 359/269 |
| 4,728,177 | 3/1988 | Green | 359/270 |
| 4,804,275 | 2/1989 | Kang et al. | 359/267 |
| 4,832,468 | 5/1989 | Ito et al. | 359/275 |
| 4,842,381 | 6/1989 | Green | 359/269 |
| 4,844,591 | 7/1989 | Arribart et al. | 359/270 |
| 4,923,289 | 5/1990 | Demiryont | 359/265 |

FOREIGN PATENT DOCUMENTS 51-30757 3/1976 Japan.
57-82819 5/1982 Japan.
58-184129 10/1983 Japan.

Primary Examiner—Rolf Hille
Assistant Examiner—Mahshid Saadat
Attorney, Agent, or Firm—Charles H. Ellerbrock; Clifford L. Sadler

[57] ABSTRACT

A method of gradationally infusing a graded thickness permeable medium with a uniform concentration of a material is disclosed. A method of gradationally infusing a uniform thickness permeable medium with a gradational concentration of material is also disclosed. The method includes placing the material in a container, and inserting and removing the permeable medium in the container so that the permeable medium includes either a gradational or uniform concentration of the material therein dependent upon the thickness of the medium. The method disclosed also allows uniform thickness or graded thickness electrochromic materials to be gradationally infused with an ion source to provide a color gradient within an electrochromic device. An electrochromic device made according to this method is also disclosed.

21 Claims, 1 Drawing Sheet

ELECTROCHROMIC DEVICE WITH COLOR GRADIENT AND METHOD OF MAKING THE DEVICE

BACKGROUND OF THE INVENTION

1. Field of the Invention

The present invention relates to electrochromic devices which exhibit coloration and bleaching thereof at ambient temperature by control of the polarity of an induced electric field. More particularly, this invention relates to a device and method for providing an electrochromic device with a gradient of color, i.e., color of different intensity in different regions thereof.

2. Discussion of the Related Art

Electrochromic devices are devices in which a physical/chemical change produced in response to an induced electric field results in a change in the reflective (or transmissive properties) of the device with respect to electromagnetic radiations, e.g., uv, IR, and visible radiation. Such devices, one embodiment being shown as item 10 in FIG. 1, generally comprise a film of electrochromic material and an ion-conductive insulating layer which functions as an electrolyte layer. The film and the electrolyte layer are in surface contact with each other for exchange of ions between the electrochromic film and the electrolyte layer. Two conductive electrode layers in FIG. 1, at least one of them being transparent, are disposed on the opposite outer surfaces of the film and the electrolyte layer to provide means for applying a voltage across the combined thickness of the electrochromic film and the electrolyte layer. The electrode layers are provided on substrates, which substrates may be of a material such as glass. Depending on the ion providing and ion storage capacity of ion conductive layer, a counter electrode located between ion conductive layer and electrode layer may be used. The electrodes are provided with external electrical leads connected to a voltage providing source. Application of a voltage of proper polarity across the electrodes causes coloration of the electrochromic layer. By reversing the polarity of the applied voltage, the colored electrochromic layer will be uncolored (bleached). Changing from the bleached state to the colorless state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". In some embodiments, the coloration can be erased by simply short circuiting the electrodes through an external circuit, there being enough internally stored charge to supply the reversed voltage required to raise the coloration in electrochromic layer.

In such devices, the electrochromic film usually comprises an inorganic metal oxide material, most commonly a transition metal oxide, in particular: tungsten oxide. When tungsten oxide is the electrochromic material, the electrolyte layer is adapted to provide a positively charged light cation, preferably, a proton or a lithium ion. The electrolyte layer is generally a liquid electrolyte solution which comprises polymers or copolymers containing acidic groups such as polystyrene sulfonic acid or a solid compound like lithium chloride.

The electrolyte layer also may be a gel like polyvinyl butyral-methanol doped with LiCl.

It would be desirable in some situations to have an electrochromic display device which exhibits gradations of color intensity in different regions of the device during operation of the device, for example, to provide a monochromatic "picture" based on the same color but different intensities thereof. It would further be desirable to provide an electrochromic device having a gradient band of coloration, e.g., a more intense coloration in a lower region as compared to its upper region. Such a device could find use as walls of an office that could be switched from the colorless state to a graded colored state at will to provide privacy. It could eliminate the combined glass wall/venetian blind combination often used in offices today. Advantageously it would be easier to keep clean. It further will be appreciated that it might be desirable to have an electrochromic device which includes a gradient band in which the upper portion is more intensity colored than the lower region. Such a device might be useful as the windshield of an automobile, for the windows or buildings or for sunglasses.

One electrochromic device that includes a gradient of color intensities was disclosed by the instant inventor in U.S. Pat. No. 4,923,289. This device includes two substrates and therebetween: one electrode layer; an electrochromic material; an ion conductive material; and another electrode layer in that order. The electrochromic material has a continuously decreasing thickness gradient in at least one region when measured normal to the plane of an electrode layer.

SUMMARY OF THE INVENTION

The present invention is directed to a method of gradationally infusing a permeable medium having a uniform thickness with ions of a material. The invention is also directed to a method of gradationally infusing a permeable medium having a graded thickness with ions of a material. The method includes placing the material in a container, and inserting and removing the permeable medium from the container so that the permeable medium contains a gradationally infused concentration of the material therein. The method disclosed allows electrochromic materials to be gradationally infused with an ion source to provide a color intensity gradient within an electrochromic device. The gradational infusion of the material, and therefore, the color intensity gradient of the electrochromic device, can be of infinitely different patterns which are primarily dependent upon the infusion procedure and the shape of the permeable medium. In an electrochromic device this means the shape of the electrochromic material or the counter electrode.

A device and method for making an electrochromic device adapted to provide a color intensity gradient during operation of the electrochromic device is also disclosed. The device comprises a substrate and thereon: a first electrode layer; an electrochromic material; an ion conductive material; a counter electrode and another electrode layer in that order. At least one of the first electrode layer and the second electrode layer is transparent and each electrode layer is in contact with a another layer. The ion conductive layer is adapted to communicate ions between the electrochromic material and the counter electrode upon application of a voltage across the first and second electrode layers. The method comprises gradationally infusing either the electrochromic layer or the counter electrode layer or both with ions prior to assembling the electrochromic device. The electrochromic device may include a counter electrode and/or an electrochromic layer having a continuously decreasing thickness gradient in at least one region when measured normal to the plane of the first or second electrode layer. Preferably, the combined total thickness of the electrochromic material, the counter electrode and the ion conductive material is substantially uniform. The more infused regions of the electrochromic material and/or the counter electrode are correspondingly associated with the regions of more intense color during operation of the device.

Advantageously, it has been found that according to embodiments of the method of the present invention a device can be made which is capable of providing different percent reductions of radiation in different region of the device, correspondingly providing a gradient of intensity of coloration in different regions.

DETAILED DESCRIPTION OF THE PREFERRED EMBODIMENTS

Figure 1:
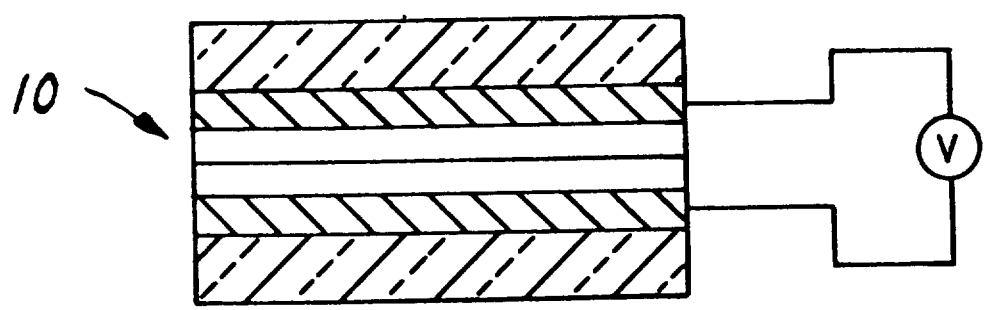
FIG. 1 is a schematic representation of an electrochromic device, in cross-section, according to the prior art.

In this invention, a method is provided for forming regions of an electrochromic device disclosed above which are gradeable in color intensity during operation of the electrochromic device. As disclosed above, the method comprises gradationally of infusing the electrochromic layer and the counter electrode with ions prior to assembling the device. This loading procedure is suitable for a uniform thickness electrochromic and/or counter electrode layer or one with a thickness gradient in at least one region when measured normal to the plane of an electrode layer. In the later case, the more infused regions of the electrochromic material and/or counter electrode are correspondingly associated with the regions of more intense color during operation of the device.

The present invention is usable in a five layer electrochromic device. This device includes two substrates, preferably glass and therebetween an electrode, a counter electrode, a fast ion conductor (electrolyte), an electrochromic material and another electrode. Either or both electrodes adjacent to the substrates may be transparent. In this embodiment, both the electrochromic material and the counter electrode layers have a uniform thickness. It is also possible to assemble a five layer device with only one substrate and the five layers being disposed thereon.

In a specific example which was prepared, both electrodes adjacent to the substrates were transparent and were made of a pyrolytic $SnO_2$:F layer with a sheet resistance of 14 Ohm/sq. The electrochromic layer was a 400 nm thick sputter deposited $WO_3$, the electrolyte was an ion conductive copolymer (PEO-PPO composite) doped with Li salt ($LiClO_3$) and the counter electrode providing the ion storage function was a 250 nm thick sputter deposited $V_2O_5$ layer.

The procedure of gradationally infusing the electrochromic material and/or the counter electrode is then performed prior to assembling the device. Gradationally infusing in this patient application refers to the procedure of inserting ions of a material into a permeable medium having a uniform thickness, so as to form a gradational ion concentration within the medium when measured perpendicular to the direction of ion infusion. It also refers to the procedure of inserting ions of a material into a permeable medium having a graded thickness, so as to form a uniform concentration of ions throughout the graded medium.

For electrochromic devices the procedure of gradationally infusing includes adding ions into the electrochromic material and/or the counter electrode. To accomplish this procedure, it is necessary to apply an electrolytic loading voltage to one of the electrodes and then place the permeable medium in a container containing the material to enter the medium. Typically the material used is a lithium compound. The lithium ions in an electrochromic device move back and forth from the electrochromic layer to the counter electrode through the fast ion conductor (electrolyte) by applying a driving voltage to the electrodes and changing its polarity. After the active layer (permeable medium) is gradationally infused, the electrochromic device can be assembled. In the case of an electrochromic device with only one substrate which has five layers built up therefrom the infusion procedure must be done on the counter electrode and/or electrochromic material layer prior to the further deposition of the additional layers. In this device it is also possible to add a protective layer on top of the last layer and this protective layer can be plastic or glass or some other acceptable material.

An electrochromic device with an electrochromic material and/or counter electrode may be gradationally infused so that the device will exhibit a color intensity gradient when it is operated. This procedure involves inserting (or dipping) the permeable medium into a container having the material to be gradationally infused therein and then removing the medium in a certain manner. It is possible, for example, to have infinitely many insertion and removal velocities for the medium and it is contemplated that these velocities can even change during each of the inserting and removing steps. Typically the ion infusion procedures for prior art electrochromic devices employing uniform thickness electrochromic and/or counterelectrode layers were such that the medium was quickly inserted into the container having the material followed by a significantly longer period where the permeable medium sat submerged in the material to be infused and then the medium was quickly removed. This meant that the concentration of the material was uniform throughout the permeable medium.

The gradational infusion procedure of the present invention contemplates that it is possible to obtain a gradational concentration of material in a uniform thickness permeable medium, when measured in a direction perpendicular to the direction of ion infusion. This can be accomplished by inserting the permeable medium faster than removing it as well as removing the medium faster than inserting it. It is also contemplated that the rate of inserting and/or removing the permeable medium can be adjusted during these procedures.

More specifically, it is contemplated that the permeable medium could be inserted into the material up to a certain point quickly and then slowly pulled upward.

This would gradationally infuse more material at the lower end of the permeable medium than the upper end. Further, it is contemplated that the medium could be slowly inserted up to a predetermined point and then quickly withdrawn. Other rates are contemplated and would allow one to obtain infinitely gradational concentrations of ions in the permeable medium.

For electrochromic devices, gradational infusing can be accomplished by inserting the electrochromic layer and/or the counter electrode into a container containing an electrolyte, for example, one mole of $LiClO_3$ dissolved in methanol and applying the necessary electrolytic loading voltage ($-3$ Volts) to a transparent electrode. The infusion voltage is only maintained during the dipping process of the film. This process will yield a highly reproducible gradational concentration of ions.

The dipping rate of the active layer can be calculated from:

$$D = mkT/e \text{ and } v = Wd/Wt$$

where D is the diffusion constant, m is the charge mobility ($4 \times 10^{-11}$ cm$^2$/Vsec), kT is the Boltzman energy for temperature T (0.0025 eV for room temperature), and e is the electronic charge ($1.6 \times 10^{-19}$ Coulomb), v is the dipping rate, Wd and Wt are the thickness augmentation of the colored area during Wt time interval respectively. The diffusion constant of Li in $WO_3$ film was calculated as $10^{-12}$ cm$^2$/sec for 3 Volts. The device size in this example was 30 cm. $\times$ 30 cm. The gradational area was designed as 30 cm. $\times$ 8 cm. The total dipping time and dipping rate was calculated as 1600 sec and 0.007 cm/sec respectively, corresponding to Wd=400 nm and 8 cm of the gradational width.

One drawback with the gradational ion concentration in a uniform thickness electrochromic layer is that over time there was some degradation. This occurred over time while the device was switched numerous times. The degradation was the disappearance of the color gradation by forming a uniform color, faded device. A further lateral diffusion from high concentration region to the low concentration region was responsible for this degradation. The degradation was also observed when it was aged without switching.

In order to prevent the degradation of the electrochromic device having uniform thickness layers of electrochromic material and counter electrode, a new device was formed with one of these layers being uniform and another formed as a thickness gradient layer as described in U.S. Pat. No. 4,923,289. This embodiment and others will be described below in conjunction with FIGS. 2 and 3.

Figure 2:
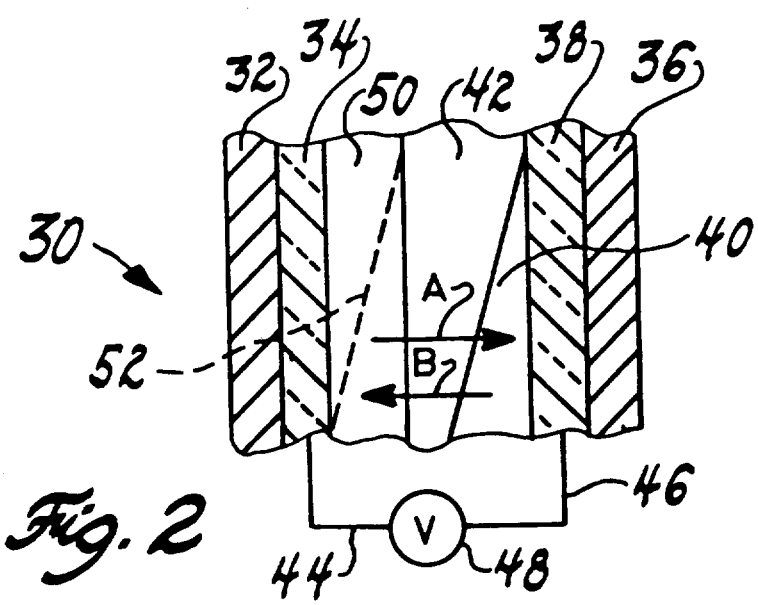
FIG. 2 is a schematic representation of an embodiment of an electrochromic device, in cross-section, according to the present invention.
Figure 3:
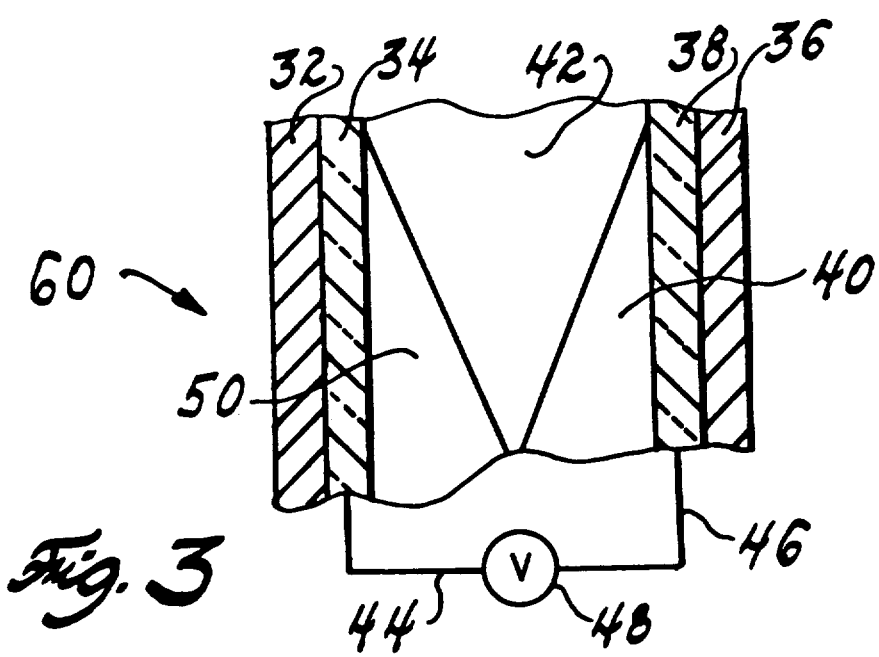
FIG. 3 is a schematic representation of a second embodiment of an electrochromic device, in cross-section, according to the present invention.

The embodiment of this invention shown as device 30 and device 60 of of FIGS. 2 and 3, respectively, each individually comprise glass substrate 32 in contact with electrode layer 34 and glass substrate 36 in contact with transparent electrode layer 38. Devices 30 and 60 each further comprise electrochromic material 40 and counter electrode 50 in contact with ion conductive material 42.

During operation of these devices, a voltage is applied across the electrodes by leads 44 and 46 connected to a voltage providing device 48. If electrochromic layer 40 comprises a cathodic electrochromic material like tungsten oxide, a voltage of negative polarity applied to electrode layer 34 would cause the electrochromic material to change from colorless to blue, i.e., from its bleached to colored state.

In FIG. 2, the electrochromic material 40 is shown as having a thickness gradient and the counter electrode 50 is shown with a uniform thickness. This device is gradationally infused prior to assembly with the methods described above so that the counter electrode contains a gradational concentration of ions as shown by dotted line 52 or the electrochromic layer 40 has a uniform concentration of ions by the proper inserting and removing steps during infusion. Then during operation of the device, the ion transfer follows the basic pathway shown by arrows A and B. It was found that this device can also experience degradation because of the diffusion of ions in the uniform thickness layer from the region of high concentrations of ions to the region of lower concentrations of ions. Thereafter, when the ions have diffused and are switched to the side having the thickness gradient, too many ions are present at the thinner region of the active layer and ions diffuse to the thicker region of the active layer.

In a further attempt to halt all degradation, the device shown in FIG. 3 was assembly. In this device, both the electrochromic material 40 and the counter electrode 50 were formed of a graded thickness layer and then the side to be gradationally infused was treated with the material containing Li ions. It was gradationally infused such that it contained a uniform concentration of ions. Then upon switching, it was found that all of the ions from the electrochromic layer were transferred to the counter electrode. Since both layers were made from graded thickness layers which were mirror images of each other, there was no diffusion within either layer and thus no deterioration, whether time dependent or otherwise. It was important to gradationally infuse the active layer of the device in the manner described earlier to obtain the uniform concentration throughout the layer.

As will be apparent to those skilled in the art in view of the present disclosure, the thickness of the electrochromic material may vary throughout the electrochromic material. U.S. Pat. No. 4,923,289 is expressly incorporated herein. When these devices are colored they exhibit a variation in color intensity which would be maximum where the electrochromic material was the thickest and be minimum where the electrochromic material is the thinnest. Such a device might be useful as walls of an office when one needs privacy for a meeting. Still other uses and configuration of devices according to this invention will be apparent to those skilled in the art in view of the present disclosure.

The substrate employed in the device may comprise any material which is stable at the temperatures and under the conditions of the fabrication and use of the device. Commonly used materials for the substrates of such devices include, e.g., glass, polycarbonate, quartz, plastic, and the like and suitable combinations of any of them. As least one of the substrates will be at least translucent, preferably being transparent. It is also possible to have one of the substrates be reflective to have a reflective type of device. Selectional of the optimal material to be used for one or both substrates of the device will be apparent to one skilled in the art in view of this disclosure.

The electrodes used in the electrochromic device of this invention may be any material which, relative to the electrochromic film, is electrically conductive. At least one of the electrode-substrate combinations is transparent, although both may be. If it intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrate by any known technique, including vacuum evaporation, chemical vapor deposition, sol-gel deposition, ion plating, reactive sputtering, etc. The transparent electrode layer may be formed by the so-called thick film processes such as screen printing or coating. When the thick batch film process are used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which a well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include fully oxidized compounds comprising metal wherein the metal has variable oxidation states. Exemplary of such anodic electrochromic material are iridium oxide, and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

Counter electrodes 50 are generally employed between the ion conductive layer and an electrode of the device (i.e., between ion conductive material 42 and electrode layer 34 of the device of FIGS. 2 or 3) to improve operation of the device. A counter electrode may be formed of, e.g., $WO_3$ doped with and alkali metal ion. This material is generally not meant to be electrochromic. Exemplary of counter electrode materials that can also be used include $V_2O_5$ and $WO_3$ as well as others well known to those skilled in the art.

As disclosed above, the electrochromic material and the counter electrode of the device may comprise graded thickness layer in order to provide the gradient of intensity of coloration. It is believed herein that a colored electrochromic material exhibits metal like optical properties, such that transmitted light intensity decreases exponentially with film thickness. Thus the transmission gradient (color intensity gradient) may be controlled by controlling the thickness gradient or profile of the electrochromic material.

The electrochromic material may be provided on the appropriate surface in the device, e.g., in the embodiments shown in FIGS. 2 and 3 on the electrode layer, by any suitable technique. For example, the electrochromic material may be provided by vacuum deposition, chemical vapor deposition, thermal evaporation, sputtering, sol-gel deposition, and the like. Application of a graded electrochromic film, i.e., comprising a thickness gradient, can be controlled in various ways. For example, it can be controlled by varying the distance of the deposition device to the substrate on which the electrochromic material is being applied or by tilting the substrate, since the closer the substrate to the source the thicker the applied film.

Another simple technique to achieve a graded thickness of the electrochromic material is to use a substrate which moves with a varying velocity or a mask which moves relative the substrate. Still other techniques for depositing a film of variable thickness will be apparent to those skilled in the art in view of the present disclosure. Usually the thickness of the electrochromic layer is between about 0.1 and 100 microns in the thick region. Optimal thickness also will be determined by the material of the film. Selection of the optimal electrochromic material and method of its deposition will be apparent to those skilled in the art in view of the present disclosure.

The ion conductive layer can be said to comprise an ion source means for providing ions into the electrochromic material upon application of a voltage across the electrode layers. The ion conductive layer (often referred to as the electrolyte) can be selected from a number of materials. Exemplary of dielectric materials useful as the ion conductive layer are tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), silicon oxide ($SiO_2$), magnesium fluoride, zirconium phosphate, or a mixture thereof (a thin film of such a dielectric material serves as an insulator for electrons but as a conductor for protons ($H+$, or other light ions e.g., $Li+$, $Na+$, $Cu+$ and $Ag+$) and hydroxy ions ($OH-$)).

It is known that the ion conductive layer is adapted to contain ions or include an ion source for emitting ions upon application of a voltage. Exemplary of solid electrolytes useful as the ion conductive layer are sodium chloride, potassium chloride, sodium bromide, potassium bromide, sodium bromide, $Na_3Zr_2Si_2PO_{12}$, $Na_{1+x}ZrSi_xP_{3-x}O_{12}$, $Na_5YSi_4O_{12}$, or $RbAg_4I_5$. The ion conductive layer may also be a water or proton source-containing synthetic resin copolymer of Φ-hydrozyethyl methacrylate with 2-acrylamide-2-methylpropane sulfonic acid, a hydrate vinyl copolymer (e.g., a hydrate methyl methacrylate copolymer), or a hydrate polyester.

The ion conductive layer also can be an electrolytic solution of an acid (e.g., sulphuric acid, hydrochloric acid, phosphoric acid, acetic acid, butyric acid, or oxalic acid) or an aqueous solution thereof, an aqueous solution of an alkali (e.g., sodium hydroxide or lithium hydroxide), or an aqueous solution of a solid strong electrolyte (e.g., sodium hydroxide, lithium chloride, potassium chloride, or lithium sulfide. Exemplary of semi-solid gel electrolytes useful as the ion conductive layer are those, for example, obtained by gelling an electrolytic aqueous solution with a gelling agent (e.g., polyvinyl alcohol, CMC, agar-agar or gelatin). Preferably, the ion conductive layer is selected from a material which comprised alkali metal compounds. Most preferably, such compounds are selected from nitrate salts and chloride salts of alkali metal compounds. The alkali metal in such compounds are preferably selected from lithium, potassium and sodium. Selection of the optimal ion conductive material would be apparent to one skilled in the art in view of this disclosure. As is known to those skilled in the art, the thickness of the ion conductive layer may vary, optimal thickness being dependent on such considerations as desired maximum intensity of the color, type of ion conductive material, configuration of the device, etc.

In the embodiments of the devices shown in FIG. 2 and 3, the devices could be formed by applying electrode 34 on substrate 32 upon which is deposited electrochromic layer 40 and counter electrode 50 could be formed on electrode 38. The electrochromic material and the counter electrode can be provided on the respective electrode layer by any suitable technique, the thickness of the electrochromic material and/or the counter electrode in different regions thereof being provided as described above. Thereafter, the ion conductive material 42, if it were a solid or gel, could be provided as shown in FIGS. 2 and 3 in such thickness so that the combined total thickness (when taken normal to the surface of electrode layer 34) of the electrochromic material, the counter electrode and the ion conductive material is substantially the same. If on the other hand it was desired to use a liquid ion conductive material, the device would be assembled as shown in FIGS. 2 and 3 by sealing three of the edges of the device with a material like silicone or epoxy. The cavity formed in the device in this way could then be filled with a liquid ion conductive material.

As would be apparent to those skilled in the art in view of the present disclosure, the method of this invention is applicable to any electrochromic device as well as any permeable medium. Examples of infusible media contemplated by the present invention include porous $SiO_2$, $TiO_2$, $Al_2O_3$ or other transparent or translucent material, porous plastic like Nafion TM or porous ceramics. Examples of materials that can be infused into these media in a variable concentration gradient include electrolytes (as described above), salts, dies and photochromic materials. It is also possible to provide additional processing steps after gradational infusing for certain materials. For example it is possible to have a drying process after loading. This is applicable for evaporating the solvent (methanol in the case of an electrochromic device) or causing a chemical reaction which would provide different properties to the permeable medium (such as changing the refractive index due to the chemical reaction occurring from drying).

Media loaded by this procedure could also be used as sensors or in different optical devices due to different lateral optical paths and their lateral absorption. Other applications are also possible with this method.

In view of the disclosure, many modifications of this invention will be apparent to those skilled in the art. It is intended that all such modifications which fall within the true scope of this invention be included within the terms of the appended claims.

I claim:

1. A method of gradationally infusing a uniform thickness permeable medium with a material to obtain a gradational concentration of the material within the medium, when measured perpendicular to the direction of ion infusion, comprising:
    placing the material in a container;
    inserting the permeable medium into the material within the container; and
    removing the permeable medium from the material, in a manner so as to inject a gradational concentration of the material into the permeable medium.

2. The method as defined in claim 1, further comprising the step of adjusting the rate of at least one of said step of inserting or said step of removing.

3. The method as defined in claim 1, wherein said step of inserting is faster than said step of removing.

4. The method as defined in claim 1, wherein said step of removing is faster than said step of removing.

5. The method as defined in claim 1, wherein the permeable medium is a metal oxide.

6. The method as defined in claim 1, wherein the material are ions of an electrolyte.

7. The method as defined in claim 1, wherein the material is a salt.

8. The method as defined in claim 1, wherein the material is a dye.

9. The method as defined in claim 1, wherein the material is a photochromic material.

10. A method for making an electrochromic device adapted to provide a color intensity gradient during operation of the electrochromic device which comprises a substrate and thereon: a first electrode layer; an electrochromic layer; an ion conductive material; a counter electrode and a second electrode layer in that order, the ion conductive layer being adapted to communicate ions between the electrochromic layer and the counter electrode upon application of a voltage across the first and second electrode layers, the method comprising:
    depositing at least one of the electrochromic layer and the counter electrode with a graded thickness gradient in at least one region when measured normal to the plane of the first or second electrode layer; and
    gradationally infusing the at least one of the electrochromic layer and the counter electrode having the thickness graded with a uniform concentration of ions prior to assembling the electrochromic device.

11. The method as defined in claim 10, wherein said step of depositing includes depositing both the electrochromic layer and the counter electrode with a graded thickness.

12. The method as defined in claim 10, wherein said step of gradationally infusing includes applying a voltage to one of the first and second electrodes.

13. An electrochromic device which comprises a substrate and thereon: a first electrode layer; an electrochromic material; an ion conductive material; a counter electrode and a second electrode layer in that order, said ion conductive layer being adapted to communicate ions between said electrochromic material and said counter electrode upon application of a voltage across said electrode layers, and wherein both of said electrochromic material and said counter electrode have a graded thickness in at least one region when measured normal to the plane of an electrode layer.

14. The device as defined in claim 13, wherein at least one of said electrochromic material and said counter electrode include an ion source infused therein.

15. The device as defined in claim 13, wherein said electrochromic material is selected from tungsten oxide, molybdenum oxide, copper oxide, cobalt oxide, lead oxide, bismuth oxide, iridium oxide and nickel hydroxide.

16. The device as defined in claim 13, wherein said ion conductive material is selected from materials comprising hydrogen ions and from materials comprising alkali metal compounds.

17. The device according to claim 16, wherein said alkali metal compounds are selected from compounds comprising nitrates and chlorides of alkali metals.

18. The device as defined in claim 13, wherein the combined total thickness of said electrochromic material, said counter electrode and said ion conductive material being substantially uniform.

19. A method of gradationally infusing a graded thickness permeable medium with a material to obtain a uniform concentration of the material throughout the permeable medium, comprising:
   placing the material in a container;
   inserting the permeable medium into the material within the container; and
   removing the permeable medium from the material, in a manner so as to inject a uniform concentration of the material into the permeable medium.

20. The method as defined in claim 19, wherein said step of inserting is faster than said step of removing.

21. The method as defined in claim 19, wherein said step of removing is faster than said step of inserting.

* * * * *